(12) United States Patent
Caves et al.

(10) Patent No.: US 7,379,423 B1
(45) Date of Patent: May 27, 2008

(54) FILTERING SUBSCRIBER TRAFFIC TO PREVENT DENIAL-OF-SERVICE ATTACKS

(75) Inventors: Evan John Caves, Santa Barbara, CA (US); Henri Altarac, Santa Barbara, CA (US); Koral Ilgun, Nevada City, CA (US)

(73) Assignee: Occam Networks, Inc., Santa Barbara, CA (US)

( * ) Notice: Subject to any disclaimer, the term of this patent is extended or adjusted under 35 U.S.C. 154(b) by 977 days.

(21) Appl. No.: 10/394,288

(22) Filed: Mar. 20, 2003

(51) Int. Cl.
*G01R 31/08* (2006.01)
(52) U.S. Cl. ............... 370/232; 370/230; 370/392
(58) Field of Classification Search ............... 370/232, 370/230, 392
See application file for complete search history.

(56) References Cited

U.S. PATENT DOCUMENTS

| | | | |
|---|---|---|---|
| 6,717,944 | B1 | 4/2004 | Bryden et al. |
| 6,847,649 | B2 | 1/2005 | Sutanto |
| 2001/0042200 | A1 | 11/2001 | Lamberton et al. |
| 2002/0010869 | A1 | 1/2002 | Kim |
| 2003/0037163 | A1 | 2/2003 | Kitada et al. |
| 2003/0043853 | A1 | 3/2003 | Doyle et al. |
| 2003/0152067 | A1* | 8/2003 | Richmond et al. .......... 370/352 |

OTHER PUBLICATIONS

Plummer, David C., An Ethernet Address Resolution Protocol—or—Converting Network Protocol Addresses to 48.bit Ethernet Address for Transmission on Ethernet Hardware, Nov. 1982, pp. 1-10.

Ferguson, P. et al, Network Ingress Filtering: Defeating Denial of Service Attacks which employ IP Source Address Spoofing, May 2000, pp. 1-10.

Patrick, M. "DHCP Relay Agent Information Option", pp. 1-14, Jan. 2001, Motorola BCS, Network Working Group, Request for Comments: 3046, Category: Standards Track. Copyright2001 The Internet Society.

Wikipedia, "Address Resolution Protocol", 4 pages, Downloaded Jun. 13, 2007 from http://en.wikipedia.org/wiki/Address_Resolution_Protocol.

Computer Dictionary, "ARP (Address Resolution Protocol)," Microsoft Press, 3rd Edition, p. 30 (1997).

* cited by examiner

*Primary Examiner*—Huy D. Vu
*Assistant Examiner*—Jason Mattis
(74) *Attorney, Agent, or Firm*—Blakely, Sokoloff, Taylor & Zafman LLP

(57) ABSTRACT

A method of storing address lease information including a Media Access Control (MAC) address, an IP address, and a port for a subscriber in a database coupled to a network edge device when an address lease is associated with the subscriber, receiving subscriber packets on at least one port of the network edge device, comparing source address information from packets purportedly transmitted by the subscriber with address lease information associated with the subscriber, and forwarding those of the packets if source address information from the packets, including source MAC and IP addresses, corresponds to address lease information associated with the subscriber.

14 Claims, 8 Drawing Sheets

Network Packet

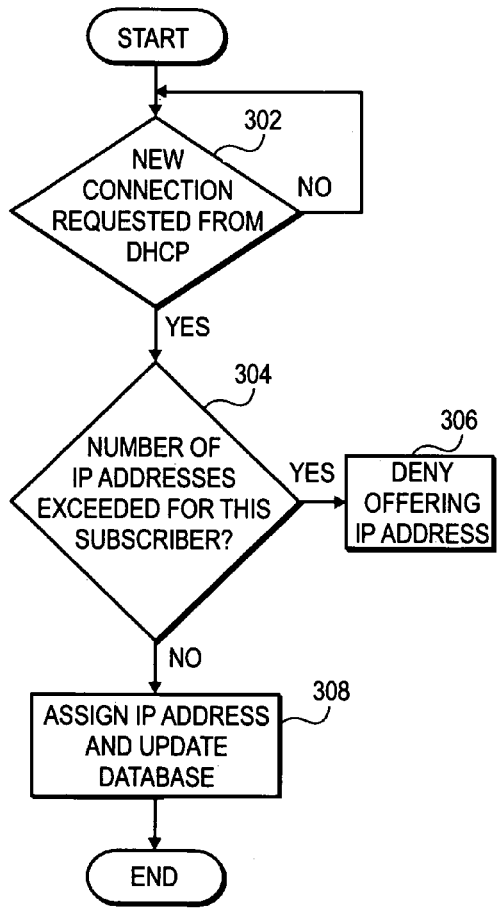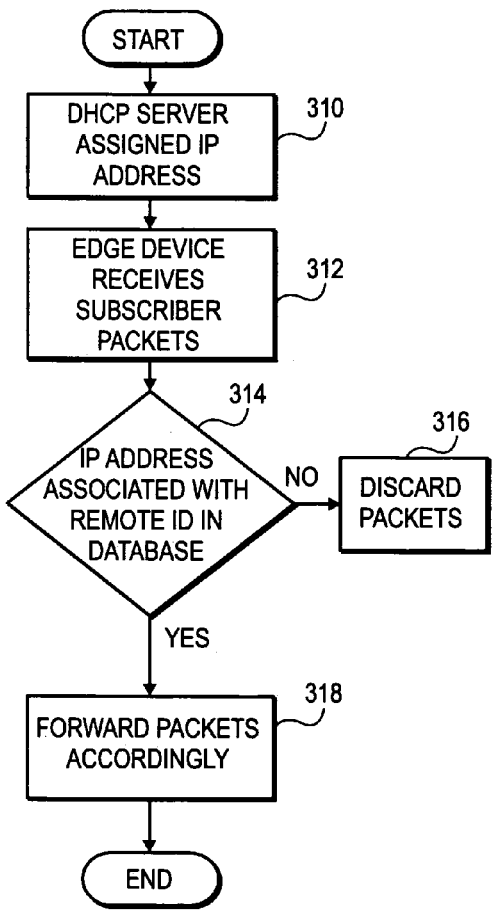
FIG. 3A
(PRIOR ART)
FIG. 3B
(PRIOR ART)

FILTERING SUBSCRIBER TRAFFIC TO PREVENT DENIAL-OF-SERVICE ATTACKS

FIELD OF THE INVENTION

The present invention relates to the field of network security. More specifically, the invention relates to a method and device for preventing denial of service attacks originating from subscribers of Internet service.

BACKGROUND

Communication is the cornerstone of business and personal relationships. Today, people in offices and homes do a great deal of communicating over computer networks and expect such communication to be reliable and their data secure. Therefore, network security has become a major concern for Internet Service Providers (ISPs) and company network administrators. Network security seeks to prevent hackers from attacking a network and disrupting the flow of communication, productivity, and overall service.

Hacker is a slang term used to refer to individuals who attack or gain unauthorized access to computer systems for the purpose of manipulating and/or stealing data and/or disrupting the flow of data in and out of a network. Hacking can occur from within or from outside the network being hacked and requires knowledge of how a network is organized.

Network communication is best explained by using the International Organization for Standardization (ISO) standard referred to as Open System Interconnection (OSI). OSI is a standard for worldwide communications that defines a networking framework for implementing protocols in seven layers. Its purpose is to guide product implementers so that their products will consistently work with other products.

The OSI seven layers are as follows: Application Layer 7, Presentation Layer 6, Session Layer 5, Transport Layer 4, Network Layer 3, Data Link Layer 2, and Physical Layer 1. For example, a Local Area Network (LAN) connected to a subscriber network by an Ethernet switch is considered to be in the Network Layer 3. The Data Link Layer 2 includes two sub layers, a Logical Link Control (LLC) layer and Media Access Control (MAC) layer. The MAC layer interfaces directly with the network media such as Ethernet switches, routers, or subscriber access devices through a MAC address. A MAC address is a hardware address that uniquely identifies each node or device on a network as compared to an Internet Protocol (IP) address that is a virtual identifier of a user or computer on a Transmission Control Protocol/Internet Protocol (TCP/IP) network. These addresses and other transmission information are found in network packets sent and received by network users.

FIG. 1 shows typical network packet protocol fields. The protocol address space 102 specifies the type of protocol or packet type, such as IP. The operation code 104 specifies whether the packet is an ARP request packet or an ARP reply packet. The hardware address of the sender 106 and the protocol address of the sender 108 are the sender's MAC address and IP address, respectively. An IP address is an identifier for a computer or device on a Transmission Control Protocol/Internet Protocol (TCP/IP) network. Networks using the TCP/IP protocols route packets based on the IP address of the destination. The protocol address of the target 112 is the destination IP address of the machine the sender is trying to contact. Because the purpose of an ARP request packet is to resolve the target MAC address, the hardware address of the target 110 is undefined in a request packet and would only be defined in an ARP response packet.

Routers and switches are the typical devices for handling packet transmission into and out of networks. A router is a device or, in some cases software, that determines the next network point to which a packet should be forwarded toward its destination. This device is also called a gateway and it serves as the entrance into the network. A router is connected to at least two networks and decides which way to send each packet based on its current understanding of the state of the networks it is connected to. A switch is a device that filters and forwards packets to LAN segments and supports any packet protocol (e.g., ARP or IP). Generally, a switch includes the function of a router, which creates and maintains a routing or forwarding table of the available routes and their conditions for correctly forwarding packets. Many attacks are designed to take advantage of these gateway functions.

Firewall systems are the most common defense to combat unauthorized access to or from a network. Firewalls can be implemented in both hardware and software, or combination of both. All messages entering or leaving the network pass through the firewall, which examines each message and blocks those that do not meet the specified security criteria. A few common firewall techniques are packet filtering and using a proxy server. Proxy servers intercept all messages entering and leaving the network and effectively hide the true network addresses of users behind the firewall, thus keeping an outside attacker from misappropriating a user's IP address. Packet filtering examines each packet entering or leaving the network and accepts or rejects it based on user-defined rules. Packet filtering is fairly effective and transparent to users, but it is difficult to configure and susceptible to IP spoofing. IP spoofing is one technique used to gain unauthorized access to computers, whereby the intruder sends messages to a computer with an IP address indicating that the message is coming from a trusted host. To engage in IP spoofing, a hacker must find an IP address of a trusted host and then modify the packet header information so that it appears that the packets are coming from that host. Consequently the packets are erroneously transmitted creating a gap in network security.

FIG. 2 shows a common method of network ingress filtering. As discussed above, packet filtering is a common firewall technique to prevent unauthorized access to or from a network. In this method, a provider assigns a user IP address from a range of available IP addresses and records what IP address is assigned to which user (step 202). The provider gateway waits for the arrival of a new packet from the user (step 204). When a new packet arrives at the gateway device the source IP address of the user packet is extracted (step 206). If the source IP address of the packet resides within the provider's assigned range of IP addresses (step 208), the packet is forwarded towards its destination (step 212). If the source IP address of the packet does not reside within the provider's assigned range of IP addresses (step 208), the packet is discarded (step 210). Although this method prevents an attack using forged source IP addresses that do not conform to the ingress filtering rules, it does not prevent against flooding attacks that originate from valid IP addresses using a spoofed MAC address. A flooding attack is an excessive transmission of packet traffic that results in the denial of service due to an excessive consumption of provider network resources.

Approaches to network security often depend on what type of IP address lease scheme an Internet service provider employs. An Internet service provider (provider) can offer two types of IP addresses to its users, a static IP address and a dynamic IP address. In either case the provider has a fixed range of valid IP addresses it can offer. In the case of a static IP address, a provider will assign or lease, for a mutually agreed upon term, a fixed IP address. This allows a user to register a domain name and have the name associated with its fixed IP address. Alternatively, the provider may dynamically assign an IP address to the user by using a Dynamic Host Configuration Protocol (DHCP) server. In this case, the DHCP server assigns an IP address from the provider's valid range of IP addresses each time the user logs-on to the provider network by sending a DCHP request packet. Ideally, in either case, only one IP address is assigned per user MAC address. An issue arises in the dynamic case, however, when a user forges or spoofs a MAC address within the IP address request. When done repeatedly, this attack causes the DHCP server to assign all its available IP addresses to fictitious MAC addresses leaving none available for legitimate users.

FIGS. 3A and 3B illustrate current methods of handling spoofed MAC and IP addresses in the case of a dynamically assigned IP address. These methods are implemented by a DHCP relay agent coupled to a DHCP server. The server determines if assigning an IP address is appropriate and updates the database if necessary. The database contains IP address, MAC address, and remote identification (ID). Remote ID is a field that identifies the remote host or user and might be a caller ID, modem ID, or user name prompted for by a remote access server.

FIG. 3A shows a method of preventing a DHCP exhaustion attack by spoofed MAC addresses. A DHCP exhaustion attack consists of a hacker spoofing MAC addresses within individual DHCP request packets until the server has assigned all available IP addresses. As shown in FIG. 3A, a new connection, or more specifically an IP address, is requested from the DCHP server (step 302). Once the request packet has been received, the DHCP server extracts the MAC address from within the DHCP request and checks to see if the MAC address is already associated with the remote ID in the database (step 304). If the MAC address is already associated with the remote ID, the DHCP server re-offers the same IP address that is in the lease database (step 306). If the MAC address is not associated with a remote ID, the DHCP server verifies (step 304) that the number of IP addresses has not been exceeded for this subscriber before assigning a new lease (step 308).

FIG. 3B illustrates a current method of an edge device dealing with forged IP addresses by implementing a DHCP relay agent. After the DHCP server assigns an IP address to the user and creates a remote ID entry (step 310), the edge device receives packets from the user, extracts source and destination information, and accesses the database (step 312). The edge device checks to see if the source IP address within the packet transmitted by the user is associated with the remote ID (step 314). If the IP address is not associated with the remote ID the edge device discards the packets accordingly (step 316). If the IP address is associated with the remote ID then the packets are forwarded toward their destination (step 318).

However, neither of the methods discussed above address a denial of service attack created by spoofed source MAC addresses in a layer 2 network after a static or dynamic IP address has been assigned. A spoofed MAC address is harmless in a layer 3 network because the MAC address is not seen beyond the first hop router. However, in a layer 2 based network, spoofed MAC addresses may cause incorrect forwarding decisions and overflows in the forwarding tables on the provider's switches and bridges.

SUMMARY OF THE INVENTION

A network edge device is configured for preventing a denial of service attack by using destination information contained within network packets and address lease information of subscribers. In one embodiment of the present method, subscriber address lease information, including a MAC address and an IP address, is stored in a database coupled to the network edge device when an address lease is associated with the subscriber. When the packet data is received at the network edge device, the address information contained within the packets purportedly transmitted by the subscriber is compared to address lease information associated with the subscriber. The packets are forwarded if the source address information from the packets, including source MAC and IP addresses, corresponds to address lease information associated with the subscriber.

BRIEF DESCRIPTION OF THE DRAWINGS

FIG. 3A shows a method of preventing a DHCP exhaustion attack by spoofed MAC addresses.

FIG. 3B illustrates a current method of a DHCP relay agent handling a forged IP address.

DETAILED DESCRIPTION OF THE INVENTION

Figure 1:
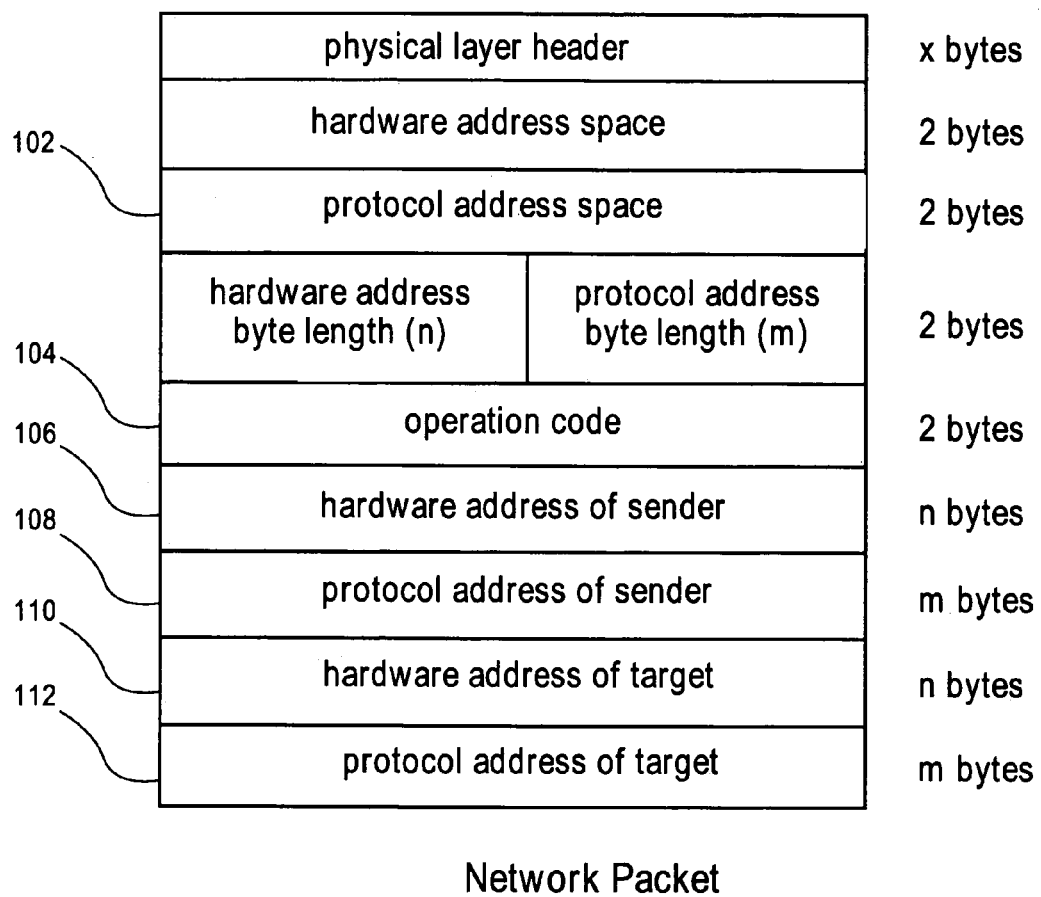
FIG. 1 shows typical network packet protocol fields.
Figure 2:
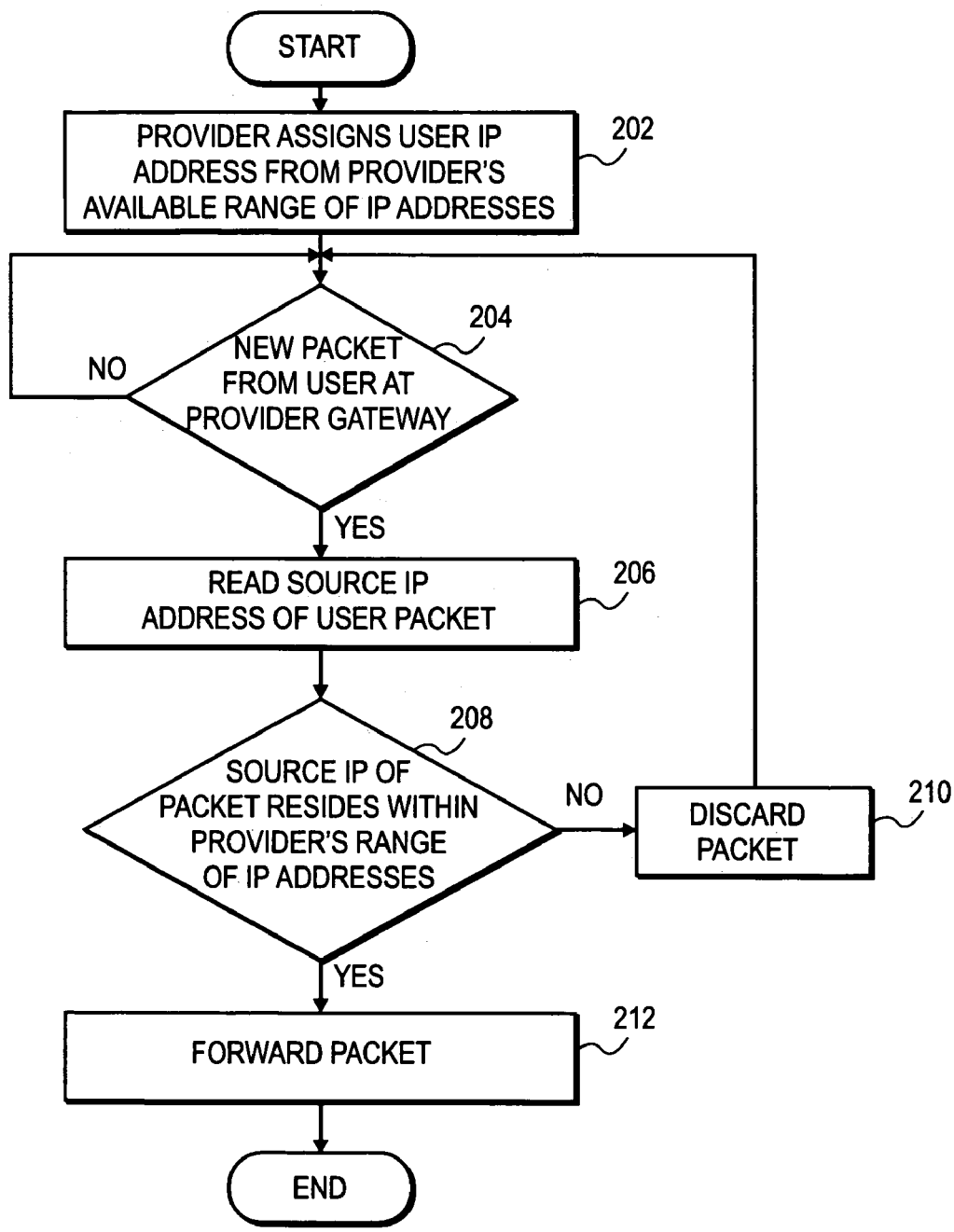
FIG. 2 shows a common method of network ingress filtering.
Figure 4:
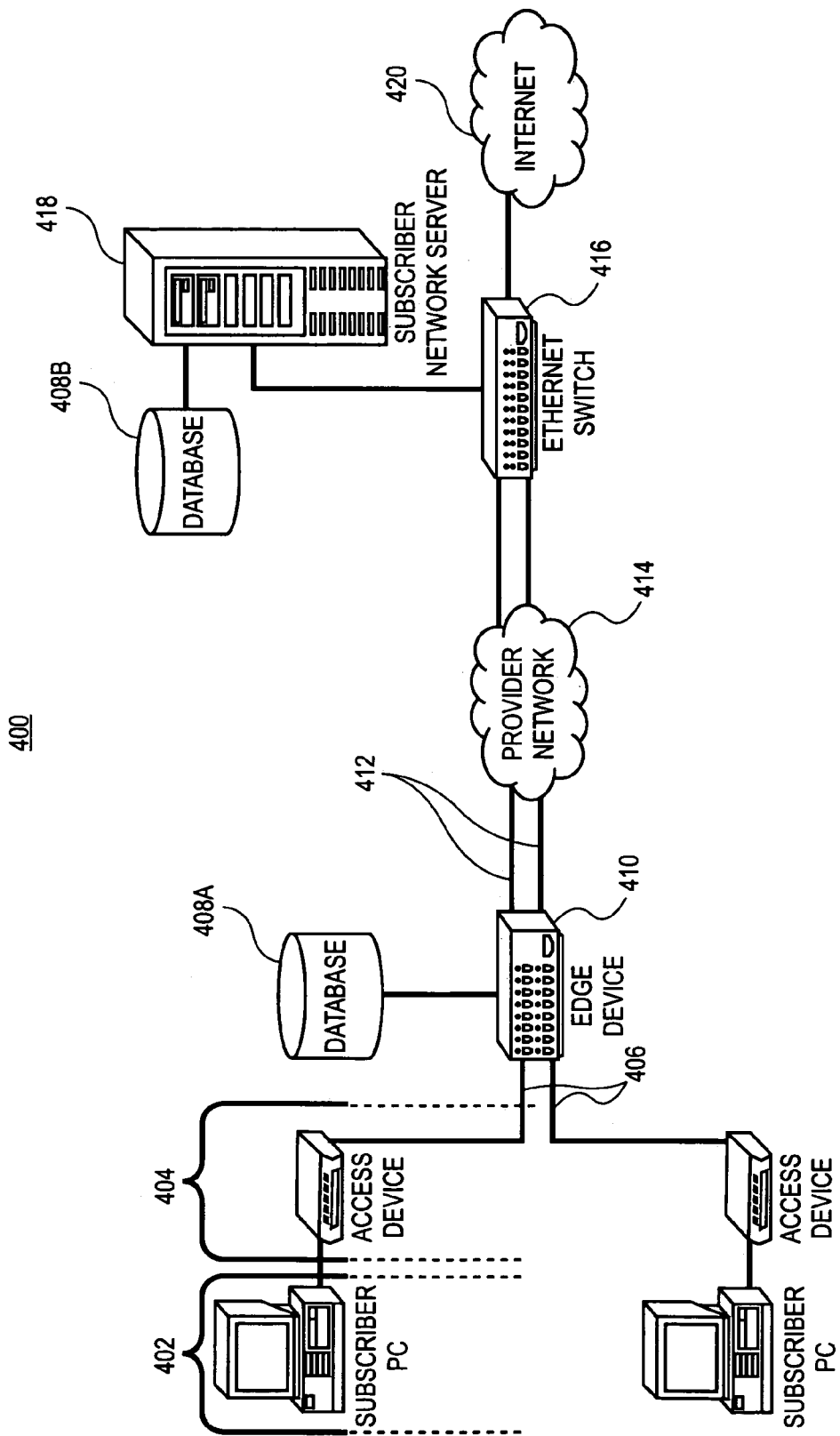
FIG. 4 illustrates a subscriber access network including an edge device where an embodiment of the present invention resides.

FIG. 4 illustrates a subscriber access network 400 including subscriber personal computers (PCs) 402 and their connectivity to the Internet 420. Subscriber PCs 402 transmit IP traffic destined for the Internet 420 through the corresponding access devices 404 and up the subscriber access links 406 to the edge device 410. In varying embodiments, access devices 404 can be any such device that establishes IP over Ethernet or Point-to-Point Protocol over Ethernet (PPPoE) traffic, such as an Asynchronous Digital Subscriber Line (ADSL), cable or dial-up modem. After receiving data from the access devices 404 through subscriber links 406, the edge device 410 then forwards the IP traffic along network uplinks 412, through the provider network 414 and the Ethernet switch 416 to the Internet 420. Traffic that originates from a subscriber PC 402 destined for another one of the subscriber PCs 402 is filtered at edge device 410 and transmitted down the appropriate one of the subscriber access links 406 associated with the destination subscriber PC 402.

The edge device 410 contains software and hardware for executing the method of the present invention including functions relating to managing subscriber IP leases and filtering incoming IP traffic. The edge device includes network ports associated with subscriber links 406 and network uplinks 412.

Filtering incoming IP traffic includes comparing source information contained within a network packet to address lease information for subscribers using subscriber PCs 402 and forwarding those of the packets if source address information from the packets, including source MAC and IP addresses, corresponds to address lease information associated with the subscriber. In an exemplary embodiment, the hardware in edge device 410 is an Ethernet switching chip including supporting components known in the art. In other embodiments the edge device may be based on an Application Specific Integrated Circuit (ASIC) configured to execute the present methods or on a suitably programmed PC or similar computer.

The database 408 includes subscriber information that is used by network devices, such as the edge device 410 and subscriber network server 418, to manage and maintain address leases. Subscriber information is made up of address lease information such as MAC addresses, their associated ports on the edge device, and subscriber IP addresses. In one embodiment, the database 408a is located at (or communicatively coupled with) the edge device 410. Alternatively, the database may be located at 408b and communicatively coupled to the subscriber network server 418. In this latter embodiment, the edge device 410 accesses the database 408b through the provider network 414. In another embodiment, a plurality of databases, such as 408a and 408b, are configured such that each can serve as a backup for the other. The databases 408a or 408b can be located on any type of memory or storage device used in the art, such as DRAM, compact flash, hard disk drive or any combination thereof.

The subscriber address lease information is used by the edge device 410 to manage address leases and filter incoming IP traffic. Static or dynamic IP address assignment determines when the address lease information is stored. For the static case, the address lease is assigned and the information stored when the fixed IP address is assigned. In the case of a dynamically assigned IP address, the address lease is assigned and the information stored each time a subscriber PC 402 negotiates a connection with the subscriber network server 418 or more specifically with a Dynamic Host Configuration Protocol (DHCP) server.

Figure 5:
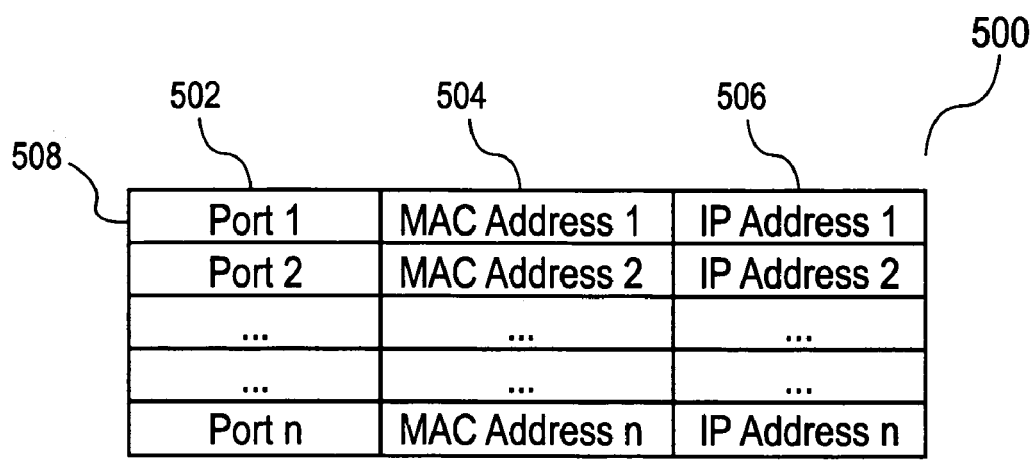
FIG. 5 is an example of a database table containing address lease information according to an embodiment of the present invention.

FIG. 5 is an example of a database table 500 containing address lease information according to an embodiment of the present invention. Column 502 shows port 1 through port n, where n represents the number of ports of the edge device, each port corresponding to a subscriber access link as discussed above with respect to FIG. 4. Column 504 contains associated MAC addresses and column 506 contains associated IP addresses. An association is made for each element in every row. For example, in row 508, port 1 is associated with MAC address 1 and IP address 1.

In an exemplary embodiment of the present invention, the IP and MAC addresses are learned through a DHCP exchange between client and server. In various embodiments, the IP and MAC addresses are statically configured or the IP address is static and the MAC address or addresses (see column 506) are populated dynamically via flow monitoring. In another embodiment, both the IP and MAC addresses are dynamically learned via flow monitoring. In yet another embodiment, the database table 500 may include other subscriber information and/or statistics unrelated to the present invention.

Figure 6:
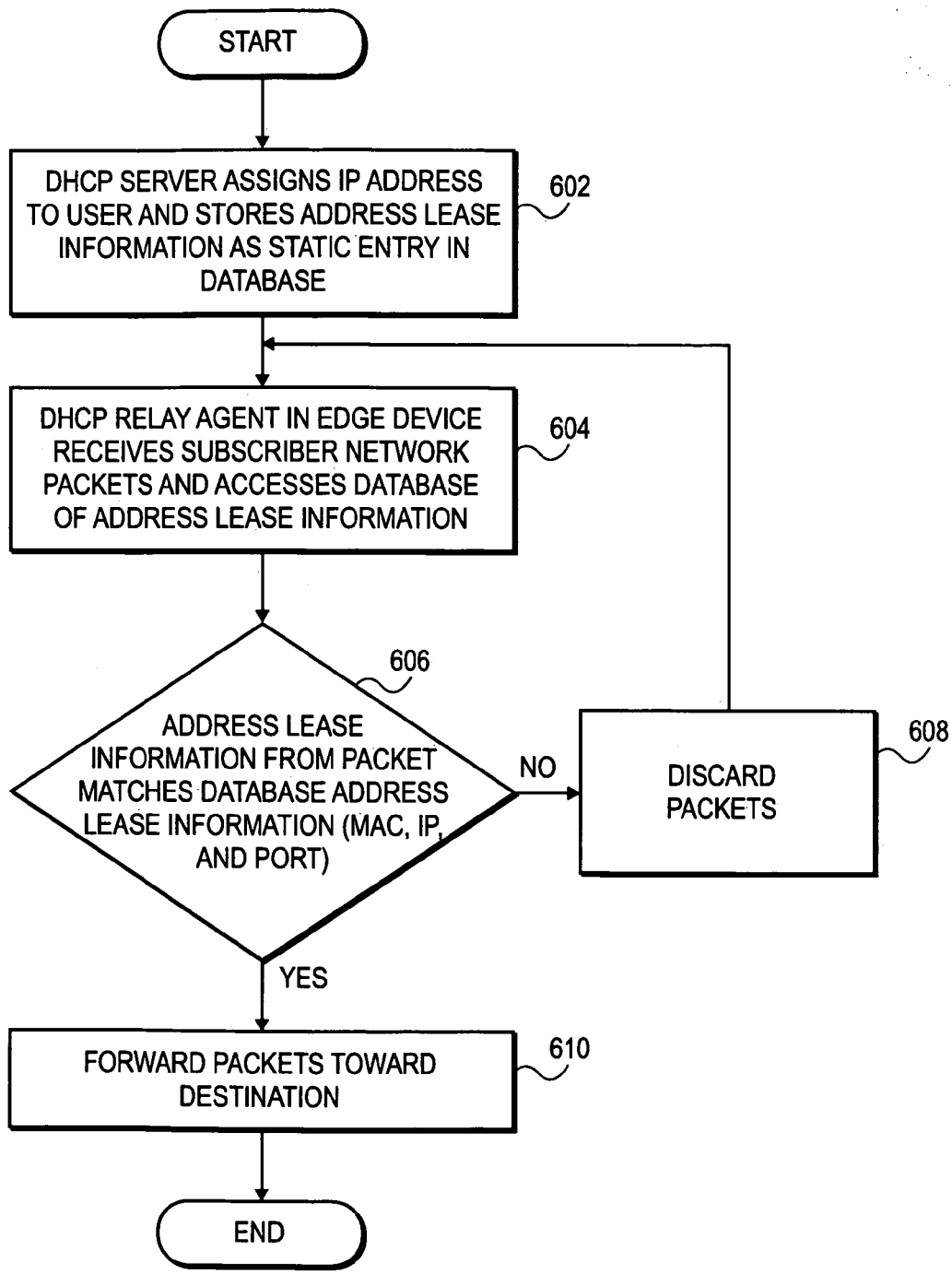
FIG. 6 illustrates one embodiment of the present invention, as executed in a network edge device running a DHCP relay agent, for filtering and handling subscriber network packets coming from a dynamically assigned IP address.

FIG. 6 illustrates one embodiment of the present invention, as executed in a network edge device running a DHCP relay agent for filtering and handling subscriber network packets coming from a dynamically assigned IP address. The DHCP server assigns an IP address to a subscriber and generates a DHCP response. The DHCP relay agent intercepts or otherwise receives a copy of the DHCP server response and stores address lease information in a database, including the subscriber MAC and IP address, and the edge device port associated with the MAC address (step 602). The edge device running the DHCP relay agent receives packets from the subscriber and accesses the database to retrieve address lease information associated with the subscriber (step 604). The source address information, specifically the MAC and IP addresses, is extracted from the subscriber packets and compared to the database entry for the address lease information associated with the subscriber (step 606). If the source MAC and IP addresses, and port from the packets do not correspond to the subscriber's address lease information, the packet is discarded and an alert may be generated and sent to a network administrator (step 608). If the source MAC and IP addresses, and port from the packets match the associated address lease information, the packet is forwarded toward its destination (step 610). Because the MAC and IP addresses are confirmed against the database entry for every packet transmitted by the subscriber, this embodiment of the invention does not allow the subscriber to spoof a MAC or IP address, even after the IP address is dynamically assigned.

Figure 7:
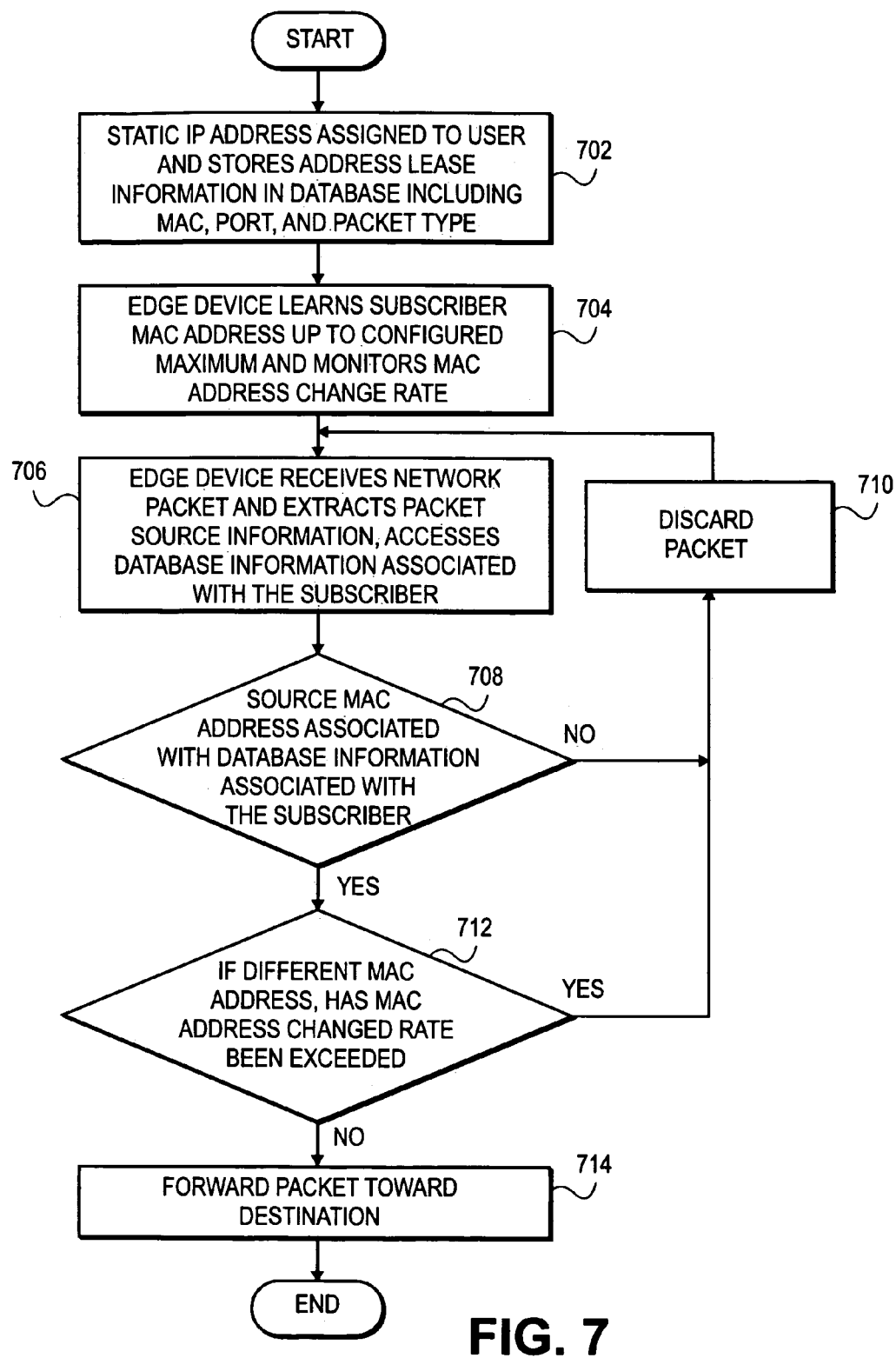
FIG. 7 shows another embodiment of the present invention when the subscriber IP address is a static IP address assigned by the provider.

FIG. 7 shows another embodiment of the present invention when the subscriber IP address is a static IP address assigned by the provider. The provider assigns one or more static IP addresses to a subscriber and stores address lease information in a database, including the subscriber MAC and IP addresses, and the edge device port associated with the subscriber (step 702). The network edge device learns, for each statically configured IP address, the associated MAC address by snooping the subscriber's traffic flow (step 704). Once a MAC address has been learned for the IP address it is not allowed to change for an administratively configured amount of time. After the configured amount of time has elapsed a new MAC address can be learned the next time a packet is received at the network edge device from a new subscriber device using the same static IP address.

The edge device receives packets from the subscriber and accesses database address lease information associated with the subscriber (step 706). The edge device checks to see if the extracted source MAC address is associated with the address lease information, including IP address and port (step 708). If the source MAC is not associated with the IP address and port, the packet is discarded (step 710). If the MAC address is different but associated with an IP address, the edge device checks to see if the rate the MAC addresses are changing has been exceeded (step 712). For example, if an IP address is associated with two MAC addresses, the rate packets are sent from alternating valid MAC addresses may be limited to one MAC address change per second. If the maximum MAC address change rate has been exceeded, the packet will be discarded (step 710), however, if the rate has not been exceeded, the packet will be forwarded accordingly toward its destination (step 714).

Thus as illustrated in FIGS. 6 and 7, in various embodiments of the present invention for preventing a denial of service attack, a network edge device stores address lease information, including a MAC address, an IP address, and a port, in a database when an address lease is associated with the subscriber. After receiving packets at the network edge device, the source address information from packets purportedly transmitted by the subscriber is compared with address lease information associated with the subscriber. If the source address information from the packets, including MAC and IP addresses, corresponds to the address lease information associated with the subscriber, the packets are forwarded accordingly.

In one embodiment of the present invention, a subscriber is assigned a static IP address (fixed) by the provider as discussed above with respect to FIG. 4. In another embodiment, each time the subscriber logs on to the provider network, the provider dynamically assigns the IP address to the subscriber as discussed above in relation to FIGS. 3A, 3B, and 6.

In yet another embodiment, the address lease information associated with the subscriber includes the subscriber's previous MAC addresses, and a maximum rate a MAC address is allowed to change for packets transmitted by the subscriber. This address lease information is used to ensure source MAC addresses of packets received do not exceed the maximum rate the MAC addresses may change for packets transmitted by the subscriber.

In one embodiment of the present invention, the network edge device for preventing a denial of service attack has at least one subscriber network port for transmitting and receiving network packets to and from a subscriber network and at least one provider network port coupled to the subscriber network port for transmitting and receiving network packets to and from a provider network. The edge device also stores the assigned address lease information in a database and can read the source address information, including a MAC address and IP address, from packets purportedly transmitted by the subscriber. The edge device compares source address information from the packets with the assigned address lease information from the database and forwards the packets if source address information from the packets, including the source MAC and IP addresses, corresponds to address lease information associated with the subscriber. In various embodiments, the database may be located at the edge device or communicatively coupled to a network server.

As illustrated above, the present invention may be implemented on a network edge device, such as edge device 410 shown in FIG. 4. When the edge device includes a general or special purpose processor, the present invention may be implemented as computer software (e.g. stored on a hard disk drive or other machine-readable medium) such that when executed by the processor a method of the invention is performed. This method performed includes storing address lease information including a MAC address and an IP address for a subscriber in a database coupled to a network edge device when an address lease is associated with the subscriber. The method further includes receiving packets on at least one port of the network edge device, comparing source address information from packets purportedly transmitted by the subscriber with address lease information associated with the subscriber, and forwarding those packets if source address information from the packets, including the source MAC and IP addresses, corresponds to address lease information associated with the subscriber.

Figure 8:
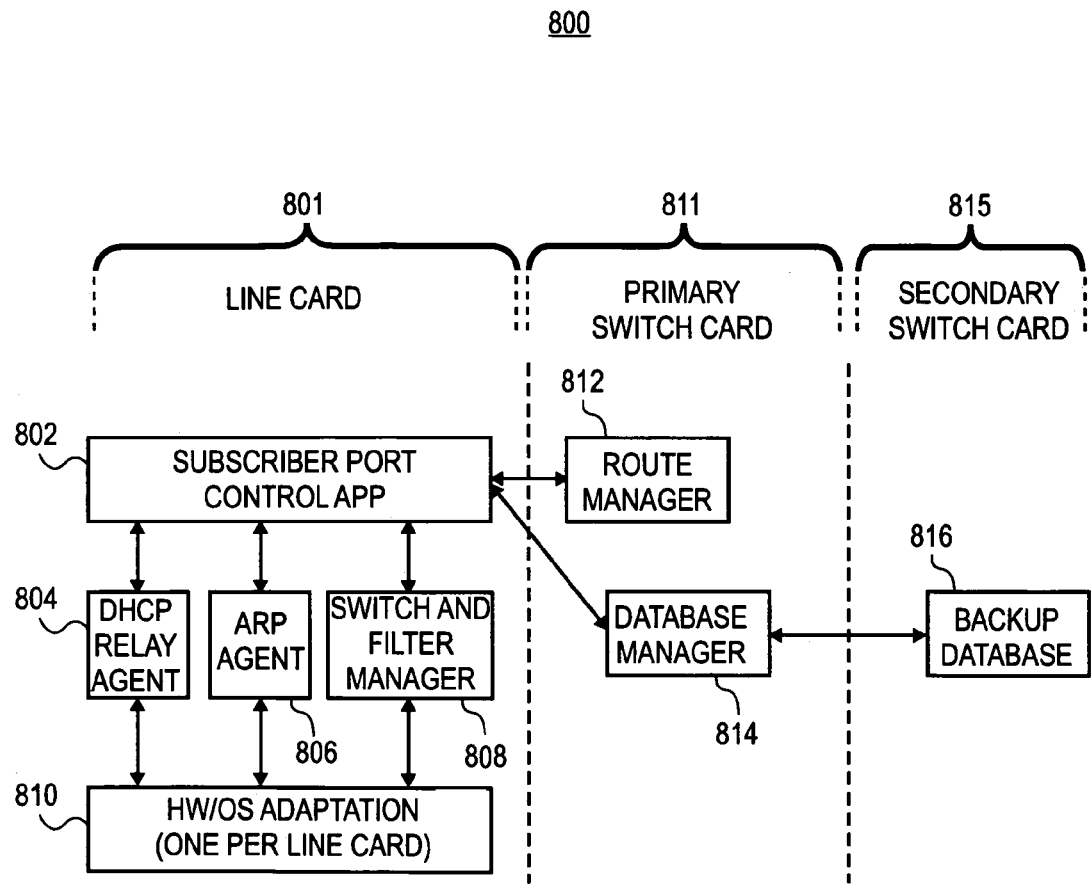
FIG. 8 illustrates a high-level software architecture for one embodiment of the present invention.

FIG. 8 illustrates a high-level software architecture 800 for an exemplary embodiment of the present invention. As shown in 800, the software architecture is distributed among three components, the line card 801, the primary switch card 811, and the secondary switch card 815. In one embodiment, the components reside in a network device, such as the edge device described above. The line card 801 includes the subscriber port controller application 802, the Dynamic Host Configuration Protocol (DHCP) relay agent 804, the ARP agent 806, the switch and filter manager 808, and the hardware operating system (HW/OS) adaptation module 810. The primary switch card 811 includes the route manager 812 and the database manager 814. The secondary switch card 815 contains the backup database 816. In other embodiments the software architecture can be implemented on various devices capable of executing machine instructions, such as an Application Specific Integrated Circuit (ASIC) or a network server.

The first line card component is the subscriber port control application 802. This application keeps the state of the various leases and interprets the lease grants and releases. The subscriber port control application 802 interacts with the route manager 812 on the primary switch card 811 and with the database manager 814. On restart, it extracts the last known set of leases from the database manager 814 and attempts to reinstall the leases and switch entries and routes.

The DHCP relay agent 804 implements the DHCP protocol and signals all changes to leases to the subscriber port controller 802. The ARP agent 806 interprets ARP packets and determines on which specific ports or links they should be forwarded based on address lease information as illustrated in the method discussed above with respect to FIG. 8.

A switch and filter manager 808 is an application used to create or delete static database entries and manage ingress filters such as the filters illustrated in the present invention. The hardware and operating system adaptation module 810 is unique to each line card and provides a mechanism to set up filters and packet handlers. For example, an Asymmetric Digital Subscriber Line (ADSL) card may have a software implementation while a Very-high-bit-rate Digital Subscriber Line (VDSL) card may require hardware assistance.

The first software component of primary switch card 811 is the route manager 812. The route manager 812 uses a control interface to create and delete routes. The database manager 814 ensures that database records are replicated to the backup switch card 815 and both databases are kept in persistent storage.

The secondary switch card 815 includes the backup database 816. The backup database 816 is controlled by the database manager 814 and is utilized in the event the primary database is compromised.

In the foregoing specification, the invention has been described with reference to specific embodiments. It will, however, be evident that various modifications and changes can be made without departing from the broader spirit and scope of the invention as set forth in the appended claims. The specification and drawings are, accordingly, to be regarded in an illustrative rather than a restrictive sense.

What is claimed is:

1. A method of preventing a denial of service attack, comprising:

storing address lease information, including a Media Access Control (MAC) address, an Internet Protocol (IP) address, and a port, for a subscriber in a database coupled to a network edge device when an address lease is associated with the subscriber, wherein the address lease information associated with the subscriber further comprises the subscriber's previous MAC addresses and a maximum rate a MAC address is allowed to change for packets transmitted by the subscriber;

receiving subscriber packets on at least one port of the network edge device;

comparing source address information from packets purportedly transmitted by the subscriber with address lease information associated with the subscriber; and forwarding those of the packets if source address information from the packets, including source MAC and IP addresses, corresponds to address lease information associated with the subscriber.

2. The method of claim 1, wherein if the source MAC address, static IP address, and port from the packets do not correspond to the subscriber's address lease information, the packet is discarded and an alert generated for a network administrator.

3. The method of claim 1, wherein before comparing the source address information from the packets, a network provider assigns an IP address lease to the subscriber.

4. The method of claim 3, wherein the IP address is a static IP address.

5. The method of claim 3, wherein the IP address is a dynamically assigned IP address.

6. The method of preventing a denial of service attack, as recited in claim 1, further comprising:

ensuring source MAC addresses of packets received do not exceed a maximum rate the MAC addresses may change for packets transmitted by the subscriber.

7. A network device for preventing a denial of service attack, comprising:

at least one first network port for transmitting and receiving network packets to and from a subscriber network;

at least one second network port coupled to the first network port, the second network port for transmitting and receiving network packets to and from a provider network; and means for storing and accessing the assigned address lease information in a database, including a Media Access Control (MAC) address, an Internet Protocol (IP) address and port for a subscriber, reading the source address information, including MAC and IP addresses, from packets purportedly transmitted by the subscriber, determining whether a MAC address change rate exceeds a predetermined rate, comparing source address information from packets against the assigned address lease information from the database and forwarding those of the packets if source address information from the packets, including source MAC and IP addresses, corresponds to address lease information associated with the subscriber, and if the MAC address change does not exceed the predetermined rate.

8. The network device of claim 7, wherein the second network port receives the assigned address lease information from the database on a network server.

9. The network device of claim 7, wherein a machine capable of receiving packets from the first port and second port executes an instruction set to compare the source address information from the packets against the assigned address lease information and discard packets that do not correspond to the address lease information assigned to the subscriber.

10. The network device of claim 9, wherein the machine is a network server comprised of a Central Processing Unit (CPU) and a storage medium.

11. The network device of claim 9, wherein the machine is an Application Specific Integrated Circuit (ASIC).

12. A machine readable medium having embodied thereon an instruction set, the instruction set being executable by a machine to perform a method, the method comprising:

storing address lease information including a Media Access Control (MAC) address, an Internet Protocol (IP) address, and a port for a subscriber in a database coupled to a network edge device when an address lease is associated with the subscriber, wherein the address lease information associated with the subscriber further comprises the subscriber's previous MAC addresses and a maximum rate a MAC address is allowed to change for packets transmitted by the subscriber;

receiving subscriber packets on at least one port of the network edge device;

comparing source address information from packets purportedly transmitted by the subscriber with address lease information associated with the subscriber; and forwarding those of the packets if source address information from the packets, including source MAC and IP addresses, corresponds to address lease information associated with the subscriber.

13. The machine-readable medium as recited in claim 12, wherein the method further includes discarding the packet and generating an alert for a network administrator if the source MAC address, static IP address, and port from the packets do not correspond to the subscriber's address lease information.

14. The machine-readable medium as recited in claim 12, wherein the method further includes ensuring source MAC addresses of packets received do not exceed a maximum rate the MAC addresses may change for packets transmitted by the subscriber.

* * * * *